US012378096B2

(12) United States Patent
Pellicioli

(10) Patent No.: US 12,378,096 B2
(45) Date of Patent: Aug. 5, 2025

(54) ROLLER FOR ELEVATOR DOOR HANGERS COMPRISING AT LEAST ONE INSERT

(71) Applicant: WITTUR HOLDING GMBH, Bayern (DE)

(72) Inventor: Fulvio Pellicioli, Sant' Omobono Terme (IT)

(73) Assignee: WITTUR HOLDING GMBH, Wiedenzhausen (DE)

( * ) Notice: Subject to any disclaimer, the term of this patent is extended or adjusted under 35 U.S.C. 154(b) by 0 days.

(21) Appl. No.: 18/698,393

(22) PCT Filed: Mar. 20, 2023

(86) PCT No.: PCT/IB2023/052718
§ 371 (c)(1),
(2) Date: Apr. 4, 2024

(87) PCT Pub. No.: WO2024/003623
PCT Pub. Date: Jan. 4, 2024

(65) Prior Publication Data

US 2025/0136414 A1 May 1, 2025

(30) Foreign Application Priority Data

Jun. 27, 2022 (IT) ........................ 102022000013540

(51) Int. Cl.
*B66B 13/30* (2006.01)
*E05D 15/06* (2006.01)

(52) U.S. Cl.
CPC ............ *B66B 13/30* (2013.01); *E05D 15/063* (2013.01); *E05Y 2201/688* (2013.01); *E05Y 2900/104* (2013.01)

(58) Field of Classification Search
CPC . F16C 13/006; B66B 13/30; E05Y 2201/688; E05Y 2900/104; E05Y 2201/668; E05D 15/063; E05D 15/0665; B60B 2900/3316; B60C 11/24
USPC ................................ 197/37; 16/91, 106, 107
See application file for complete search history.

(56) References Cited

U.S. PATENT DOCUMENTS 2,102,784 A * 12/1937 Bridges .................. B60C 11/24 264/246
2,230,744 A * 2/1941 Disbro .................. E05D 15/063 384/536
3,578,055 A * 5/1971 French .................... B60C 11/24 116/208

(Continued)

FOREIGN PATENT DOCUMENTS

| | | |
|---|---|---|
| EP | 3910143 | 11/2021 |
| KR | 20100113875 | 10/2010 |
| KR | 200452274 | 2/2011 |

OTHER PUBLICATIONS

International Search Report and Written Opinion issued in PCT/IB2023/052718 on May 27, 2023, 9 pages.

*Primary Examiner* — Jeffrey O'Brien
(74) *Attorney, Agent, or Firm* — Chrisman Gallo Tochtrop LLC

(57) ABSTRACT

A roller (1) for elevator door hangers, comprising: a roller body (2) rotatable around a central rotation axis (X), said roller body (2) having an outer groove (4) destined to move along a guide rail, at least one insert (5) embedded within the roller body (2) and arranged below said groove (4).

10 Claims, 4 Drawing Sheets

(56) References Cited

U.S. PATENT DOCUMENTS 3,929,179 A * 12/1975 Hines .................... B60C 11/24 116/208
4,226,274 A * 10/1980 Awaya .................... B60C 11/24 152/209.5
4,647,225 A * 3/1987 Grass .................... A47B 88/437 384/19
4,987,638 A * 1/1991 Ribaudo .................... E05D 15/063 104/93
5,116,142 A * 5/1992 Smith .................... F16C 19/184 384/58
5,165,142 A * 11/1992 Pilsbury .................... E05D 15/063 49/226
6,523,586 B1 * 2/2003 Eromaki .................... B60C 11/24 152/DIG. 3
7,011,126 B2 * 3/2006 Heinen .................... B60C 11/24 152/209.21
7,670,123 B2 * 3/2010 Cuny .................... B60C 11/24 425/46
7,784,508 B2 * 8/2010 Kemp .................... B60C 11/24 152/DIG. 3
8,695,655 B2 * 4/2014 Cuny .................... B60C 11/24 152/209.15
9,355,346 B2 * 5/2016 Butz .................... G06K 19/06159
10,821,783 B2 * 11/2020 Schimmoeller .................... B29D 30/72
11,207,924 B2 * 12/2021 Miyazaki .................... B60C 11/0309
11,220,139 B2 * 1/2022 Francois .................... B60C 11/24
11,254,169 B2 * 2/2022 Cambon .................... B60C 11/0323
11,298,985 B2 * 4/2022 Cambon .................... F16L 33/30
11,413,907 B2 * 8/2022 Hirsch .................... B60C 11/0306
11,766,893 B2 * 9/2023 Ballard .................... B60C 11/032 152/209.11
2005/0008275 A1 * 1/2005 Chuang .................... F16C 35/067 384/547
2009/0114322 A1 * 5/2009 O'Brien .................... B29D 30/66 156/244.18
2018/0207996 A1 * 7/2018 Serva .................... B60C 11/24
2019/0375236 A1 * 12/2019 Yamamoto .................... B60B 33/0028
2020/0108668 A1 * 4/2020 Wein .................... G21B 1/11
2020/0346496 A1 * 11/2020 Pulte, Jr. .................... B29D 30/0606
2021/0332631 A1 * 10/2021 Ma .................... E05D 13/00
2021/0339574 A1 * 11/2021 Jang .................... B60C 11/24
2023/0241923 A1 * 8/2023 Nagasawa .................... B60C 11/24 152/209.5
2024/0034015 A1 * 2/2024 Rouby .................... B29C 48/35
2024/0042806 A1 * 2/2024 Hoppe .................... B60C 13/001

* cited by examiner

ROLLER FOR ELEVATOR DOOR HANGERS COMPRISING AT LEAST ONE INSERT

TECHNICAL FIELD

The present invention relates to a roller for elevator door hangers.

BACKGROUND ART

Generally, an elevator door is installed on a guide rail in a suspended state through a hanger roller. An endless belt connected to the elevator door is provided on the output shaft of a drive motor. Accordingly, the input from the drive motor is transmitted through the endless belt and the elevator door is opened or closed by moving the hanger roller along the guide rail forward or backward.

As the hanger roller moves along the guide rail, the roller is subject to wear. Thus, there is felt the need to monitor the wear of the roller.

From document EP 3 910 143 A1 and KR 2010 0113875 A it is known a roller for elevator door hangers according to the preamble of claim 1.

DISCLOSURE OF THE INVENTION

In this context, the technical task underlying the present invention is to propose a roller for elevator door hangers which overcomes the drawbacks in the prior art as described above.

In particular, an object of the present invention is to provide a roller for elevator door hangers, which allows an operator to monitor wear even in a mounted state.

Another object of the present invention is to make available a roller for elevator door hangers, which allows to monitor wear in a reliable and time-efficient way.

The stated technical task and specified objects are substantially achieved by a roller for elevator door hangers, comprising a roller body rotatable around a central rotation axis and having an outer groove destined to move along a guide rail.

The roller comprises at least one insert embedded within the roller body and arranged below said groove.

According to one embodiment, the insert is arranged below the groove at a first predetermined distance from a lateral surface of the roller body.

According to one embodiment, the insert has an elongated development in a radial direction.

According to one embodiment, the insert has a tapered development from the central rotation axis towards the groove.

According to one embodiment, the insert is visually distinguishable from the roller body.

According to one embodiment, the insert is made of a material having an external color that is different from the color of the roller body.

According to one embodiment, the insert has an external pattern that is different from the roller body.

According to one embodiment, the roller comprises a further insert embedded and arranged below the groove at a second predetermined distance from the lateral surface of the roller body. The second predetermined distance is different from the first predetermined distance.

According to one embodiment, the inserts are spaced out from each other.

According to one embodiment, the inserts are at least partially overlapped.

According to one embodiment, one insert is entirely enclosed in the other insert.

According to one embodiment, one insert is longer than the other insert according to the radial direction.

BRIEF DESCRIPTION OF DRAWINGS

Additional features and advantages of the present invention will become more apparent from the non-limiting, description of a preferred, but non-exclusive embodiment of a roller for elevator door hangers, as illustrated in the appended drawings, in which.

DETAILED DESCRIPTION OF PREFERRED EMBODIMENTS OF THE INVENTION

Figure 1:
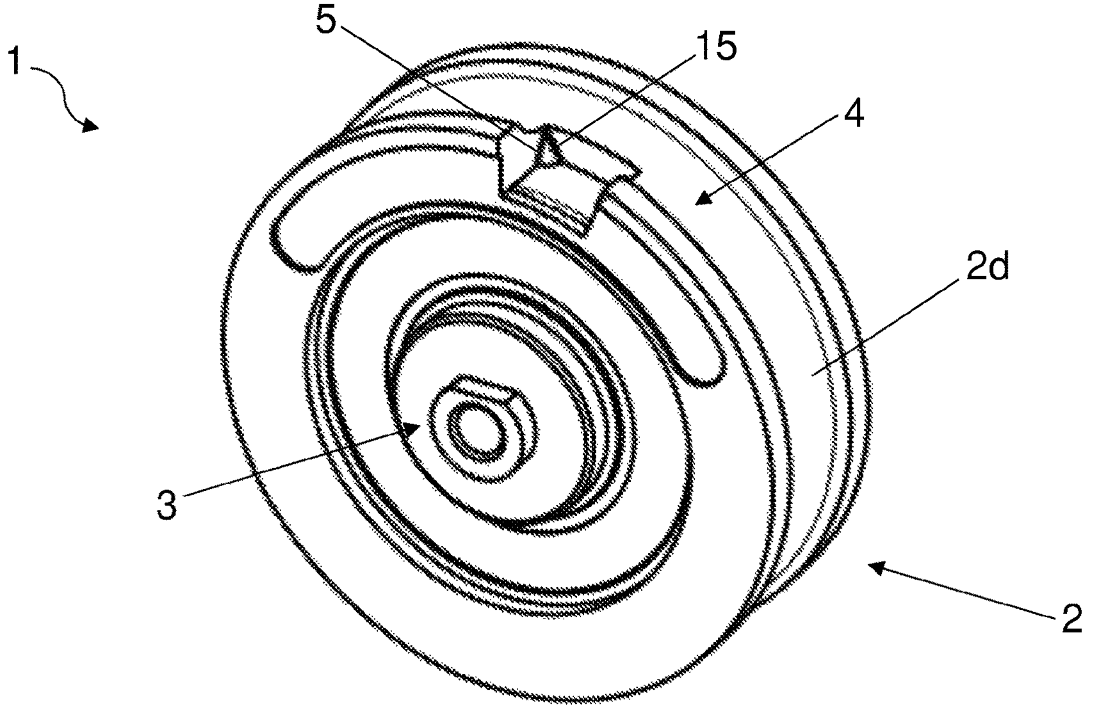
FIG. 1 illustrates one embodiment (overlapped inserts) of a roller for elevator door hangers, according to the present invention, in a perspective view.
Figure 2:
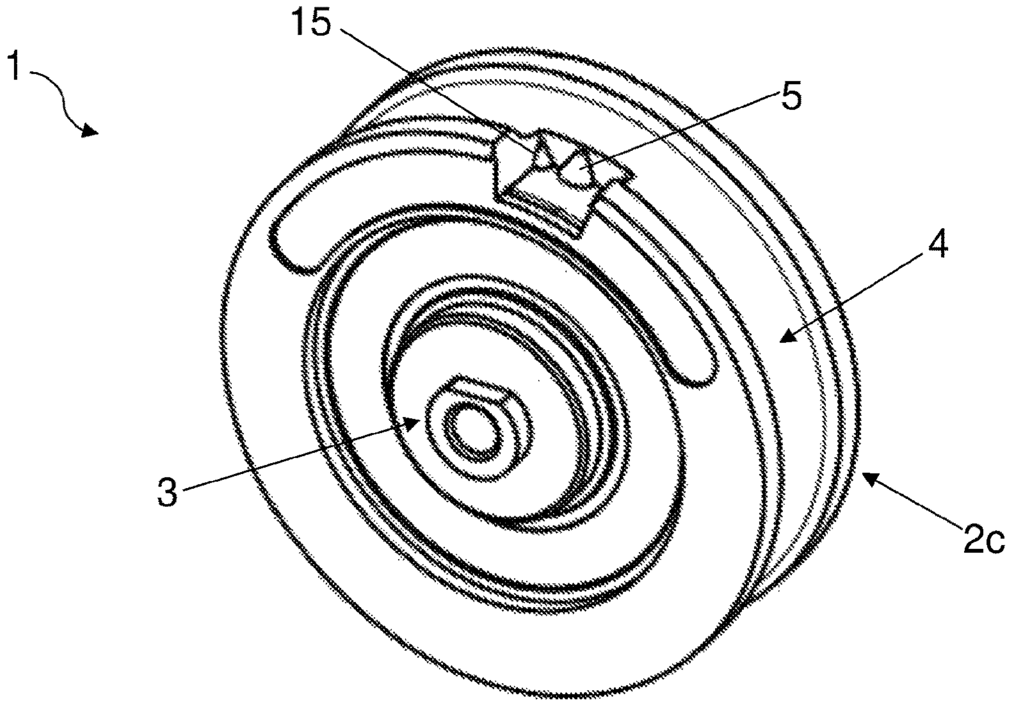
FIG. 2 illustrates another embodiment (inserts spaced out from each other) of a roller for elevator door hangers, according to the present invention, in a perspective view.

With reference to the figures, number 1 indicates a roller for an elevator door hanger (also known as "hanger roller").

The roller 1 comprises a roller body 2. The roller body 2 is rotatable around a central rotation axis X. In particular, the roller body 2 has a disk shape with a through hole 3 in a central portion. Preferably, the axis of the through hole 3 is substantially parallel to the central rotation axis X of the roller body 2. More preferably, the two axes are coincident.

In other words, the roller body 2 has the shape of a ring or an annulus with two circular and holed bases 2*a*, 2*b* that are connected by a lateral surface 2*c* following the circumferential development of the bases 2*a*, 2*b*.

The lateral surface 2*c* of the roller body 2 has an inward portion 2*d* defining a recess 4 (or groove) that follows its circumferential development. The groove 4 is shaped to partially receive a guide rail (not illustrated).

The roller 1 comprises at least one insert 5 embedded within the roller body 2 and arranged below the inward portion 2*d* of the lateral surface 2*c*, that means under the groove 4. In particular, the insert 5 is arranged below the groove 4 at a first predetermined distance from the inward portion 2*d*. As the roller 1 slides along the guide rail, the inward portion 2*d* wears out and the depth of the groove 4 increases accordingly. The insert 5 is placed below the groove 4 so as to emerge from the roller body 2 when a certain amount of wear (that is to say, a certain increase of depth of the groove 4) has occurred. The first predetermined distance is chosen based on a wear target level to be identified.

Advantageously, the insert 5 is visually distinguishable from the roller body 2. When the insert 5 emerges from the roller body 2 due to wear it means that a spot 6 (that is a part) of the insert 5 becomes exposed to the groove 4.

Advantageously, the spot 6 of the insert 5 is visually distinguishable from the roller body 2.

In this context, the expression "visually distinguishible" means that the spot 6 can be perceived by acquiring an image, either by a user or by a vision system. For example, a vision system comprises one or more optical sensors, i.e. one or more cameras.

In the embodiment here described and illustrated, the insert 5 is made of a material having an external color that is different from the color of the roller body 2.

In another embodiment (not illustrated), the insert 5 has an external pattern that is different from the roller body 2.

Preferably, the insert 5 has an elongated development in a radial direction of the roller 1.

This means that at the beginning (no wear occurred yet) the insert 5 extends from the first predetermined distance towards the center of the roller body 2.

In this case, the first predetermined distance refers to an end of the insert 5 which is faced towards the groove 4.

Preferably, the insert 5 has a tapered development towards the groove 4.

In this way, the surface of the spot 6 increases with wear, allowing the operator to recognize immediately at a glance the current level of wear.

In a preferred embodiment, illustrated in figures, the insert 5 has a conical shape.

According to the embodiment here described and illustrated, the roller 1 comprises a further insert 15 embedded and arranged below the the inward portion 2*d* of the lateral surface 2*a*, that means under the groove 4.

The further insert 15 is arranged at a second predetermined distance from the inward portion 2*d*, that is different from the first predetermined distance. This allows to identify two different levels of wear.

It is here provided a description of two inserts 5, 15. It is important to specify that the present invention works in the same way with more than two inserts 5, 15. The only limitation to the number of inserts which can be used is geometrical, that is the maximum amount fitting along the roller body 2.

According to the embodiment here described and illustrated, the two inserts 5, 15 are different in dimensions. In particular, one insert 5 is longer than the other one (further insert 15). For length here is intended the dimension in the radial direction.

In particular, the length is chosen so that when the shorter insert 15 emerges, the longer insert 5 is still visible.

Preferably, the two inserts 5, 15 originates substantially at the same radial distance from the rotation axis X and one of them is longer than the other one.

According to another embodiment (not illustrated), the two inserts 5, 15 are substantially identical in dimensions, but shifted along the radial dimension. In other words, they originate at two different radial distances from the rotation axis X.

Advantageously, the two inserts 5, 15 are visually distinguishable from each other and from the roller body 2 so that the operator may identify two different levels of wear at a glance.

When both inserts 5, 15 emerge from the roller body 2 due to wear, two corresponding parts (or spots 6, 16) are exposed to the groove 4.

According to one embodiment, illustrated in FIGS. 2, 4, 7-9, the inserts 5, 15 are spaced out from each other.

According to one embodiment, the inserts 5, 15 are at least partially overlapped.

Figure 3:
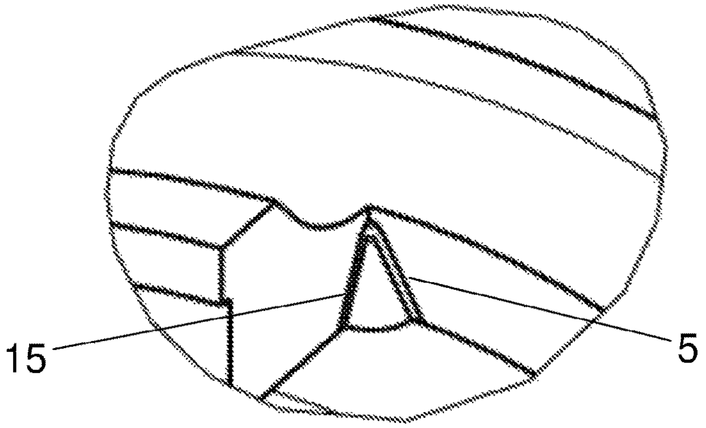
FIG. 3 illustrates a zoom of the inserts of the roller of FIG. 1.
Figure 4:
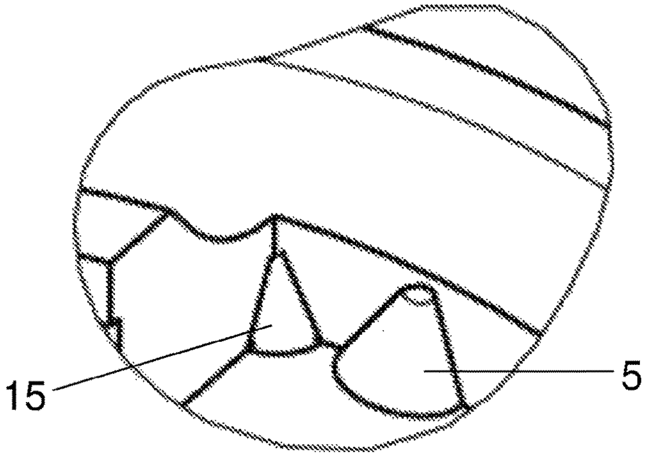
FIG. 4 illustrates a zoom of the inserts of the roller of FIG. 2.
Figure 5:
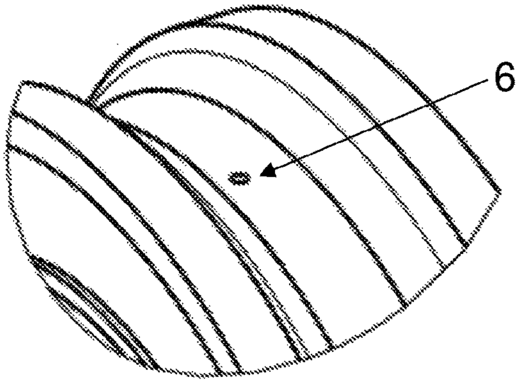
FIG. 5 illustrates the detail of the groove of the roller of FIG. 1 or 2 with an emerging spot of one insert.
Figure 6:
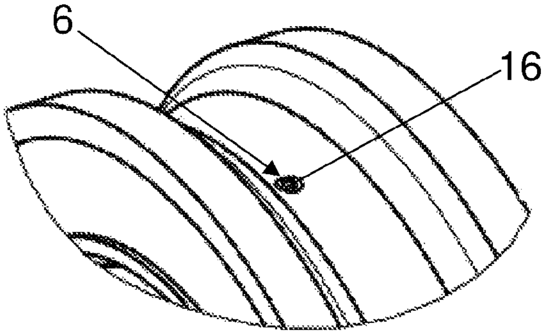
FIG. 6 illustrates the detail of two emerging spots of the two inserts of the roller of FIG. 1.
Figure 7:
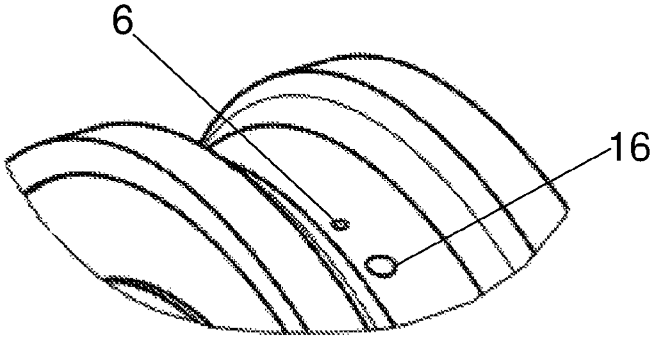
FIG. 7 illustrates the detail of two emerging spots of the two inserts of the roller of FIG. 2.
Figure 8:
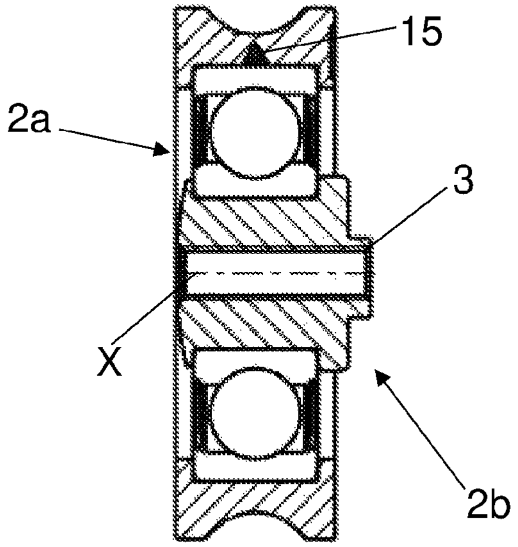
FIGS. 8 and 9 illustrates different sectional views of the roller of FIG. 2, respectively in correspondence of the two inserts.
Figure 9:
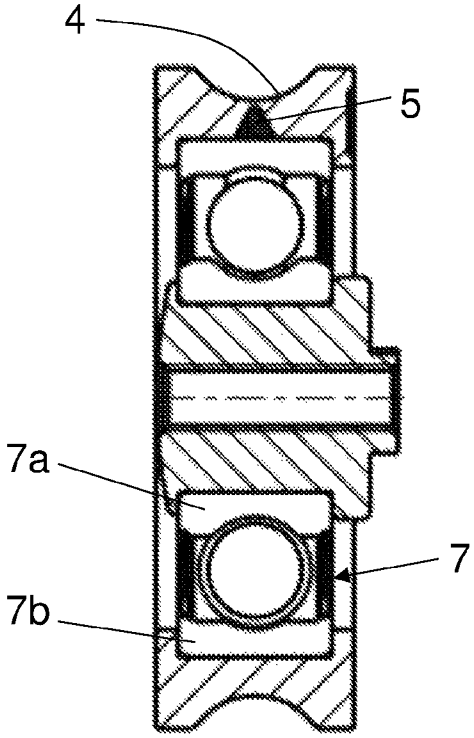

According to another embodiment, illustrated in FIGS. 1, 3 and 6, one insert 15 is entirely enclosed in the other insert 5. The spots 6, 16 of the two inserts 5, 15 will emerge at the same location. The operator sees one spot 6 if the first level of wear has been reached, two spots 6, 16 if even the second level of wear has been reached. In particular, the spot 16 of the further insert 15 is surrounded by the spot 6 of the former insert 5.

Figure 10:
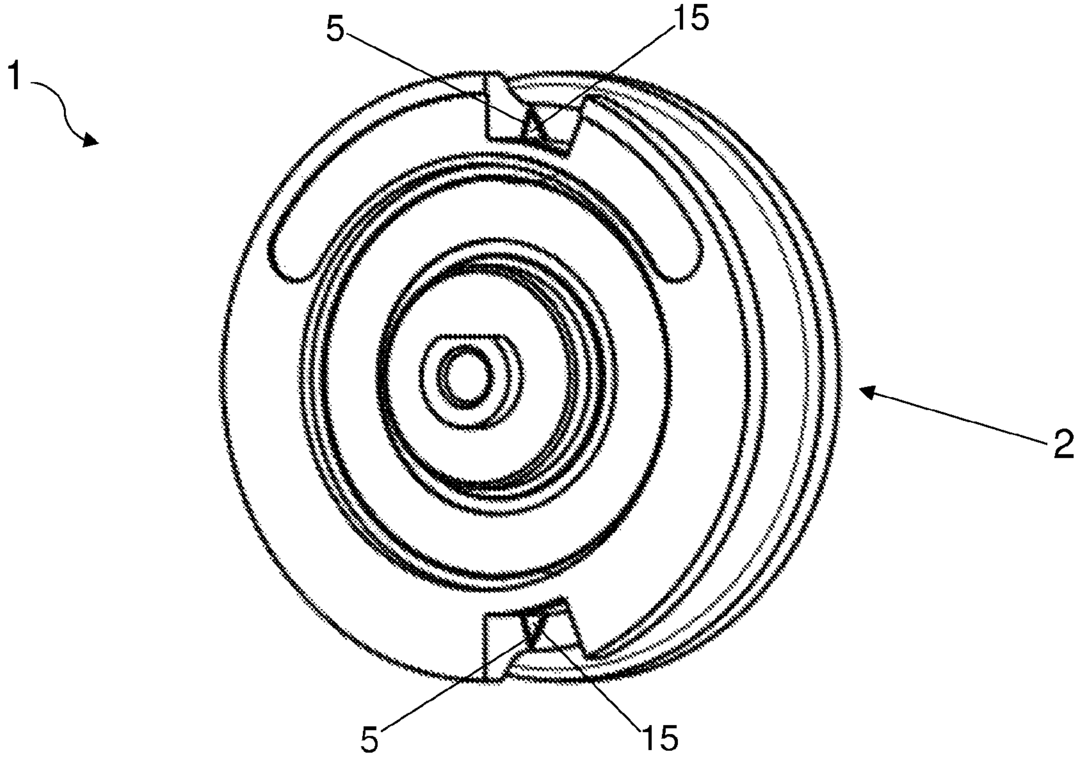
FIG. 10 illustrates the roller of FIG. 1 wherein two couple of inserts are embedded.

According to one embodiment, illustrated in FIG. 10, two couples of inserts 5, 15 are provided. They are arranged diametrically opposed to each other to facilitate the check from the operator.

In the description above reference was made to an operator/user, but it is recalled that monitoring can also be done by a vision system.

Preferably, the roller 1 has a bearing 7. The bearing 7 comprises an inner ring 7*a* and an outer ring 7*b* that are relatively rotatable with each other.

The roller body 2 is mounted so as to surround the outer ring 7*b* of the bearing 7 and is rotatable with respect to the inner ring 7*a* together with the outer ring 7*a*.

According to one embodiment, the insert 5 radially develops from a first end arranged at the outer ring 7*b* of the bearing 7 and a second end arranged at the first (or the second) predetermined distance from the groove 4.

The roller body 2 may be formed of plastic or metal or other known materials used for the hanger rollers. The material used is not a limitation to the present invention.

Preferably, the insert 5 is realized in the same material of the roller body 2 in order to avoid unexpected behaviour of the roller 1.

The characteristics of the roller for elevator door hangers, according to the present invention, emerge clearly from the above description, as do the advantages.

In particular, the presence of at least one insert below the groove allows an operator to visually identify when wear reaches a predetermined amount.

In the embodiment with a radially elongated insert, the operator is able to identify that a certain level of wear has been reached. The spot of the insert on the surface of the groove will still be visible as wear increases, so monitoring is very reliable.

In the embodiment with a tapered insert, the operator can even monitor the level of wear occurred by visual inspection. In particular, the operator may perceive a relative increase of wear compared to the previous check.

In the embodiments with at least two inserts arranged at different distances from the groove, different levels of wear may be identified, so that the operator is warned in time.

When one insert surrounds another one, the spots emerge at the same location of the groove allowing a quick check from the operator without the need to move the roller (which will require to move the entire door mechanism when the roller is mounted).

The invention claimed is:

1. A roller (1) for elevator door hangers, comprising:

a roller body (2) rotatable around a central rotation axis (X), said roller body (2) having an outer groove (4) destined to move along a guide rail;

at least one insert (5) embedded within the roller body (2) and arranged below said groove (4), said at least one insert (5) being arranged below the groove (4) at a first predetermined distance from a lateral surface (2*c*) of the roller body (2), characterized in that the roller (1) comprises a further insert (15) embedded and arranged below said groove (4) at a second predetermined distance from the lateral surface (2*c*) of the roller body (2), said second predetermined distance being different from the first predetermined distance.

2. The roller (1) according to claim 1, wherein said at least one insert (5) has an elongated development in a radial direction.

3. The roller (1) according to claim 1, wherein said at least one insert (5) has a tapered development from the central rotation axis (X) towards the groove (4).

4. The roller (1) according to claim 1, wherein said at least one insert (5) is visually distinguishable from the roller body (2).

5. The roller (1) according to claim 4, wherein said at least one insert (5) is made of a material having an external color that is different from the color of the roller body (2).

6. The roller (1) according to claim 4, wherein said at least one insert (5) has an external pattern that is different from the roller body (2).

7. The roller (1) according to claim 1, wherein the inserts (5, 15) are spaced out from each other.

8. The roller (1) according to claim 1, wherein the inserts (5, 15) are at least partially overlapped.

9. The roller (1) according to claim 8, wherein one insert (5) is entirely enclosed in the other insert (15).

10. The roller (1) according to claim 1, wherein one insert (5) is longer than the other insert (15) according to the radial direction.

* * * * *